(12) United States Patent
Li

(10) Patent No.: US 9,172,558 B2
(45) Date of Patent: Oct. 27, 2015

(54) METHOD AND SYSTEM FOR ACTIVELY PUBLISHING MESSAGE IN IM GROUP USING CHAT ROBOT

(76) Inventor: Yonghua Li, Shenzhen (CN)

( * ) Notice: Subject to any disclaimer, the term of this patent is extended or adjusted under 35 U.S.C. 154(b) by 270 days.

(21) Appl. No.: 13/320,023

(22) PCT Filed: Apr. 2, 2010

(86) PCT No.: PCT/CN2010/071530
§ 371 (c)(1),
(2), (4) Date: Nov. 10, 2011

(87) PCT Pub. No.: WO2010/142163
PCT Pub. Date: Dec. 16, 2010

(65) Prior Publication Data
US 2012/0059896 A1    Mar. 8, 2012

(30) Foreign Application Priority Data
Jun. 11, 2009    (CN) .......................... 2009 1 0107938

(51) Int. Cl.
*G06F 15/16*    (2006.01)
*H04L 12/58*    (2006.01)

(52) U.S. Cl.
CPC .............. *H04L 12/581* (2013.01); *H04L 51/04* (2013.01)

(58) Field of Classification Search
CPC ........ H04L 51/00; H04L 51/04; H04L 12/581
USPC .......................................................... 709/206
See application file for complete search history.

(56) References Cited

U.S. PATENT DOCUMENTS

| 6,571,234 | B1 * | 5/2003 | Knight et al. .......................... 1/1 |
| 7,996,462 | B2 * | 8/2011 | Degenhardt et al. .......... 709/204 |
| 2004/0019637 | A1 * | 1/2004 | Goodman et al. ............. 709/204 |
| 2005/0050151 | A1 * | 3/2005 | Mitchell et al. ............... 709/207 |
| 2005/0138132 | A1 * | 6/2005 | Zhou et al. ..................... 709/207 |
| 2005/0198149 | A1 * | 9/2005 | Johnson et al. ............... 709/206 |

(Continued)

FOREIGN PATENT DOCUMENTS

| CN | 1735027 A | 2/2006 |
| CN | 101277478 A | 10/2008 |

(Continued)

OTHER PUBLICATIONS

Liyu, "MSN Chatbot for Tel No. Retrieval," Guandgong Communication Technology, 9:59-63 (2007).

(Continued)

*Primary Examiner* — June Sison
*Assistant Examiner* — Steven Nguyen
(74) *Attorney, Agent, or Firm* — Marshall, Gerstein & Borun LLP

(57) ABSTRACT

The present invention relates to a method and system for actively publishing a message in an IM group using a chat robot. The method includes: a client adding a chat robot in an IM group satisfying a configured condition; the chat robot automatically obtaining a message and publishing the message in the IM group. In the present invention, a chat robot is added in an IM group, and a function of timed publishing messages by the chat robot is added to increase the message quantity and topics of the IM group, thus not only messages can be sent to users in time, but also IM group activity may be enhanced, which enables users to accept and love the IM group gradually.

10 Claims, 6 Drawing Sheets

(56) References Cited

U.S. PATENT DOCUMENTS

| | | | |
|---|---|---|---|
| 2005/0273503 A1* | 12/2005 | Carr et al. | 709/219 |
| 2007/0168480 A1 | 7/2007 | Biggs et al. | |
| 2008/0043986 A1 | 2/2008 | Darby | |
| 2008/0046394 A1* | 2/2008 | Zhou et al. | 706/52 |
| 2012/0030301 A1* | 2/2012 | Herold et al. | 709/206 |

FOREIGN PATENT DOCUMENTS

| | | |
|---|---|---|
| CN | 101291341 A | 10/2008 |
| CN | 101588323 A | 11/2009 |
| WO | WO-2006022769 A1 | 3/2006 |

OTHER PUBLICATIONS

Tang, "A Parade of Chatbots, Network and Information," 7:57-59 (2004).

Mexican Office Action for Application No. MX/A/2011/013299, dated Nov. 23, 2012.

Office Action from Russian Application No. 2011152806 dated Mar. 15, 2013.

Mexican Office Action for Application No. MX/A/2011/013299, dated Mar. 26, 2013. Abstract Only.

* cited by examiner

METHOD AND SYSTEM FOR ACTIVELY PUBLISHING MESSAGE IN IM GROUP USING CHAT ROBOT

FIELD OF THE INVENTION

The present invention relates to Instant Messaging (IM) field, and more particularly, to a method and system for actively publishing a message in an IM group using a chat robot.

BACKGROUND OF THE INVENTION

With the development of network technologies, IM has become a common way of network communication of people. In addition to one to one communication, IM can also create an IM group, with which friends or persons having common interests can use network to perform instant text message, voice or video communication.

The chat robot is an artificial intelligence robot, which can always online through communication means and communicate with people using a natural language. The chat robot possesses many value-added services as well as chat function. The value-added services include weather inquiry, map inquiry, life news inquiry, calculator, dictionaries, and so on.

As regional differences or cultural differences lead to that different regions have different acceptance of the IM group, users in some types of IM groups of some areas are more active, but for some other areas or some other types of IM groups, there may be the following problems: the ratio of users using IM groups is lower, the number of speakers is small, and it is difficult for users in the IM groups to find topics which the users have common interest in, and the like.

Therefore, a method is needed to improve interest of users in using the IM group and enhance the IM group activity.

SUMMARY OF THE INVENTION

The technical problems to be solved by the present invention are as follows. In view of the defect that the interest of users in IM group in some areas is not high and IM group activity is lower, embodiments of the present invention provide a method and system for actively publishing a message in an IM group using a chat robot, so as to improve users' interest in IM group and enhance the IM group activity.

To achieve objectives of the present invention, embodiments of the present invention provide a method for actively publishing a message in an IM group using a chat robot, the method includes:

a client adding a chat robot in an IM group satisfying a configured condition;

the chat robot obtaining a message and publishing the message in the IM group.

Before the step of a client adding a chat robot in the IM group satisfying a configured condition, the method preferably further includes establishing an IM group in the client.

Preferably, the step of a client adding a chat robot in the IM group satisfying a configured condition includes:

the client determining whether the IM group satisfies the configured condition; and the client adding the chat robot in the IM group if the IM group satisfies the configured condition; otherwise, returning a prompt information.

Preferably, the configured condition includes: whether the IM group is a member group; and/or, whether the IM group has paid fee; and/or, whether the server is to add a chat robot in the IM by default.

Preferably, the step of the chat robot obtaining a message and publishing the message in the IM group includes:

the chat robot receiving a second condition, and obtaining the message according to the second condition; and the chat robot receiving a pattern, and publishing the message in the IM group according to the pattern.

Preferably, the step of the chat robot obtaining a message and publishing the message in the IM group further includes:

gathering a statistic of the number of replies to the message published of members in the IM group; and adjusting the second condition according to the number of replies to the message published of members in the IM group.

Preferably, the step of the chat robot obtaining a message and publishing the message in the IM group further includes:

gathering a statistic of the number of members replying to the message published in the IM group; and, adjusting the second condition according to the number of members replying to the message in the IM group.

Preferably, the step of the chat robot obtaining a message and publishing the message in the IM group further includes:

gathering a statistic respectively of the number of replies to the message of each member in the IM group; and, adjusting the pattern according to the number of replies of each member in the IM group.

To better achieve objectives of the present invention, embodiments of the present invention provide a system for actively publishing a message in an IM group using a chat robot, the system includes:

a server and a client;

the client module is configured to establish an IM group;

the server comprises a chat robot;

the client is further configured to add the chat robot in the IM group based on a configured condition; and, the chat robot is to publish a message in the IM group.

Preferably, the chat robot includes:

a message obtaining unit, configured to obtain a message according to a predetermined condition;

a message publishing unit, configured to publish the message in the IM group according to a predetermined pattern.

Preferably, the chat robot further includes:

any one or more of a first statistic unit, a second statistic unit and a third statistic unit, wherein:

the first statistic unit is configured to gather a statistic of the number of replies to the message published of members in the IM group;

the second statistic unit is configured to gather a statistic of the number of members replying to the message published in the IM group;

the third statistic unit is configured to gather a statistic of the number of replies to the message published of each member in the IM group; and, the message publishing unit adjusts the predetermined pattern according to a statistic result of the first statistic unit and/or the second statistic unit and/or the third statistic unit, and publishes the message in the IM group according to adjusted pattern.

Preferably, the chat robot further includes: a first statistic unit and/or a second statistic unit;

the first statistic unit is configured to gather a statistic of the number of replies to the message published of members in the IM group;

the second statistic unit is configured to gather a statistic of the number of members replying to the message published in the IM group;

the message obtaining unit adjusts the predetermined condition according to a statistic result of the first statistic unit and/or the second statistic unit, and obtains a message according to adjusted condition.

Preferably, the chat robot further comprises:

a third statistic unit, configured to gather a statistic of the number of replies to the message published of each member in the IM group; and, the message publishing unit adjusts the predetermined pattern according to a statistic result of the third statistic unit, and publishes the message in the IM group according to adjusted pattern.

In the present invention, a chat robot is added in an IM group, and a function of timed publishing messages by the chat robot is added to increase message quantity and topics of the IM group, thus not only messages can be sent to users in time, but also IM group activity may be enhanced, which enables users to accept and love the IM group gradually.

BRIEF DESCRIPTION OF DRAWINGS

The present invention will be further described hereinafter with reference to accompanying drawings and embodiments, in the drawings.

DETAILED DESCRIPTION OF THE INVENTION

In order to make objectives, technical solutions and advantages of the present invention clearer, the present invention will be described in detail hereinafter with reference to accompanying drawings and embodiments. It should be understood that the specific embodiments described here are only used to explain the present invention, not used for limiting the protection scope of the present invention.

In the present invention, a chat robot may be added in an IM group, and the chat robot may be set to automatically publish messages in the IM group to increase message quantity and topics of the IM group, thus not only messages can be sent to users in time, but also IM group activity may be enhanced, which enables users to accept and love the IM group gradually.

Figure 1:
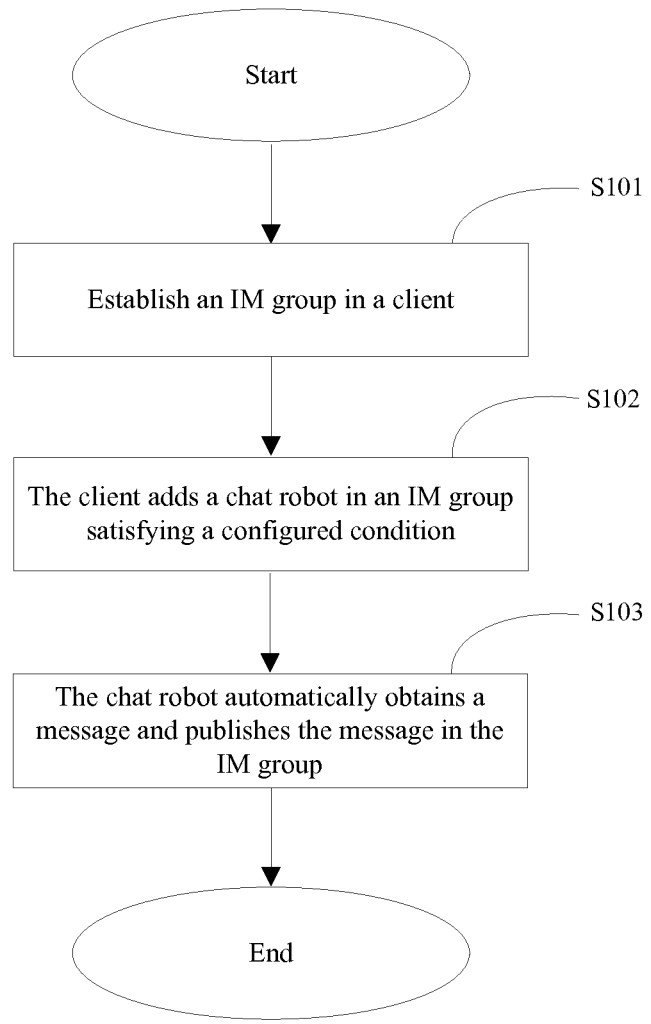
FIG. 1 is a flowchart illustrating a method for actively publishing a message in an IM group using a chat robot in accordance with a first method embodiment of the present invention.

FIG. 1 is a flowchart illustrating a method for actively publishing a message in an IM group using a chat robot in accordance with a first method embodiment of the present invention.

In step S101, at first, an IM group in a client. The IM group may be established to meet active requirements of a user of the client. A server actively sends an inquiry to a client user of some areas or a user with a certain characteristic, and the client user of some areas or the user with a certain characteristic sends a response. Alternatively, the IM group may also be established based on the response.

In step S102, the client adds a chat robot in an IM group satisfying a configured condition. The configured condition may be set by default by a background server or be set by a network administrator according to actual situations. The configured condition can be updated to further satisfy a requirement of network condition's changing.

In an embodiment of the present invention, the configured condition may be whether the IM group is a member group, if the IM group is a member group, a chat robot is added in the IM group; otherwise, no chat robot is added in the IM group. In another embodiment of the present invention, the configured condition may be whether the IM group has paid fee. In yet another embodiment of the present invention, the server may add a chat robot for all IM groups by default. In other embodiments of the present invention, other conditions may be selected as the configured condition for determining whether a chat robot is added in an IM group. For instance, the configured condition may be if the number of members in an IM group is larger than 20, a chat robot is added in the IM group. The present invention is not limited to the configured condition.

In step S103, the chat robot automatically obtains a message and publishes the message in the IM group. In an embodiment of the present invention, the chat robot may publish messages obtained from a certain channel at specific time, such as 12:30 p.m., 3:00 p.m. The messages may be hot news, or a certain blog, or Really Simple Syndication (RSS) subscription of a forum, or a message (such as advertising or system prompt) configured by a server.

In another embodiment of the present invention, it is possible to set as follows. When the number of visits to a post of a forum is larger than a certain value, such as one million, the chat robot automatically publishes the main message of the post in the IM group.

In yet another embodiment of the present invention, it is possible to set as follows. The chat robot receives messages from a certain email or a message publishing site and publishes received messages. In the embodiment, these messages may be obtained manually, or be messages captured by a network spider from several websites.

Figure 2:
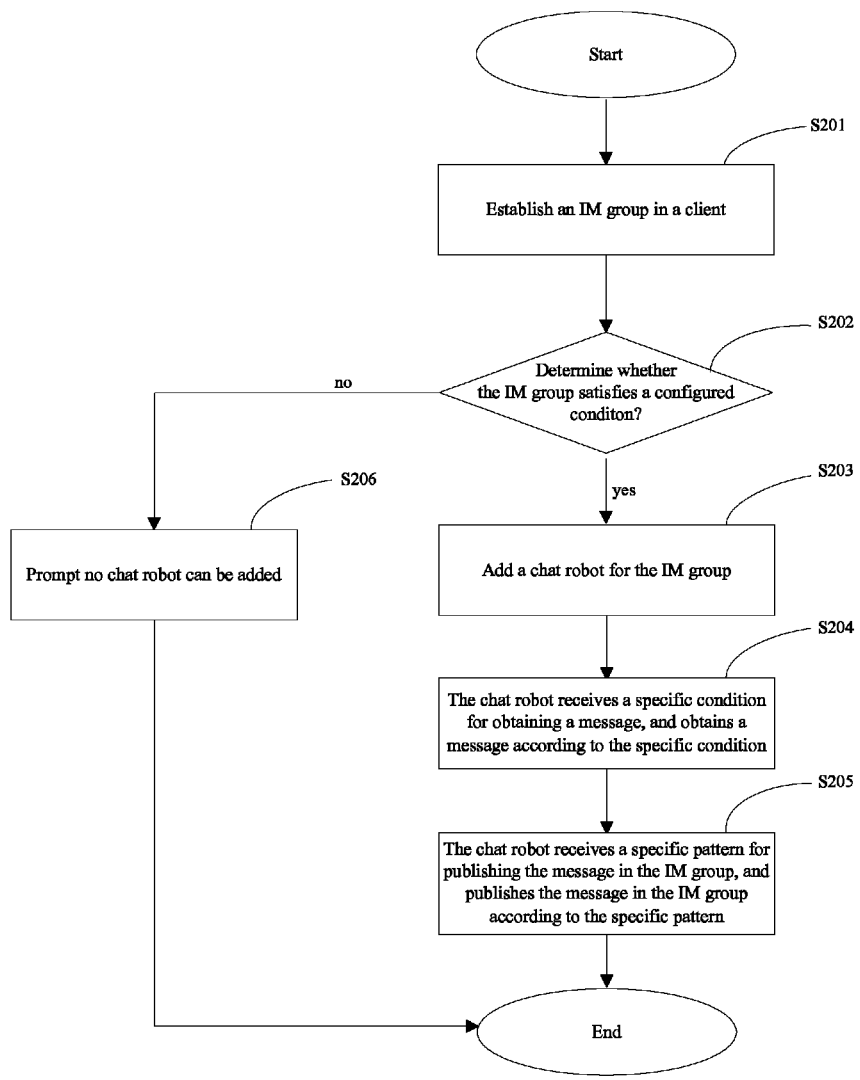
FIG. 2 is a flowchart illustrating a method for actively publishing a message in an IM group using a chat robot in accordance with a second method embodiment of the present invention.

FIG. 2 is a flowchart illustrating a method for actively publishing a message in an IM group using a chat robot in accordance with a second method embodiment of the present invention. The specific process is as follows:

In step S101, at first, an IM group is established is established in a client. The IM group may be established to meet active requirements of a user of the client. A server actively sends an inquiry to a client user of some areas or a user with a certain characteristic, and the client user of some areas or the user with a certain characteristic sends a response. Alternatively, the IM group may also be established based on the response.

In step S202, the client determines whether the IM group satisfies a configured condition. In an embodiment of the present invention, the configured condition may include: whether the IM group is a member group, whether the IM group has paid fee, and/or, whether the server is to add a chat robot in the IM group by default. If the IM group satisfies the configured condition, step S203 is performed, a chat robot is added in the IM group; otherwise, step S206 is performed, the user is prompted that no chat robot can be added, and the process is terminated.

In a preferred embodiment of the present invention, the user may be further prompted in step S206 that if the user wants to add a chat robot, what operation procedures need to be performed, to facilitate the user to select.

In the step S204, the chat robot receives a specific condition for obtaining a message, and obtains a message according to the specific condition.

The specific condition may be a default for the client or a background server. Once the chat robot is added in the IM group, the client or the background server sends the specific condition to the chat robot. The specific condition may be fixed, or can be modified.

In another embodiment of the present invention, the specific condition may be modified according to a statistic of user feedbacks on some or all messages published by the chat robot.

In an embodiment of the present invention, the specific condition includes: to obtain messages from a specific message source at specific time in the light of a specific requirement.

The specific time may be 12 a.m., or 2 p.m., or every one hour. The specific requirement may be a number of visits larger than 100,000, 200,000 or 600,000, or may be headline news, or the latest post of a certain forum, or may be a certain type of message (such as sports, entertainment and/or finance and economics). There may be one or more specific requirements. In an embodiment of the present invention, the specific requirement may be set based on replies to an earlier message of each member in the IM group. For instance, to obtain and publish the types of messages, to which each member in the IM group replies enthusiastically, as much as possible. The specific message source may be a certain blog, RSS subscription of a forum, or a system prompt came from the server. The chat robot may obtain one message from one specific message source once, or obtain multiple messages from multiple message sources once.

In the step S205, the chat robot receives a specific pattern for publishing the message in the IM group, and publishes the message in the IM group according to the specific pattern.

The specific pattern may be a default for the client or the background server. Once the chat robot is added in the IM group, the client or the background server sends the specific pattern to the chat robot. The specific pattern may be fixed, or can be modified.

In another embodiment of the present invention, the specific pattern may be modified according to a statistic of user feedbacks on some or all messages published by chat robot.

The specific pattern may include but not be limited to publishing time and objects. In an embodiment of the present invention, once obtaining a message, the chat robot may immediately publish the message to all members in the IM group.

In another embodiment of the present invention, the chat robot may publish obtained messages in different time periods according to the focus of the messages or the relationship between the messages and the IM group. For example, the IM group is an IM group of table tennis enthusiasts, and the chat robot obtains news about table tennis match and news about NBA match from a certain forum at 12 a.m. The chat robot may publish the news about table tennis match at 12 a.m., and publish the news about NBA match at 2 p.m.

In yet another embodiment of the present invention, the chat robot may publish obtained messages to part of members of the IM group. For instance, the chat robot only publishes obtained messages to the administrator, or to the members who have been members of the IM group for a certain number of years.

Figure 3:
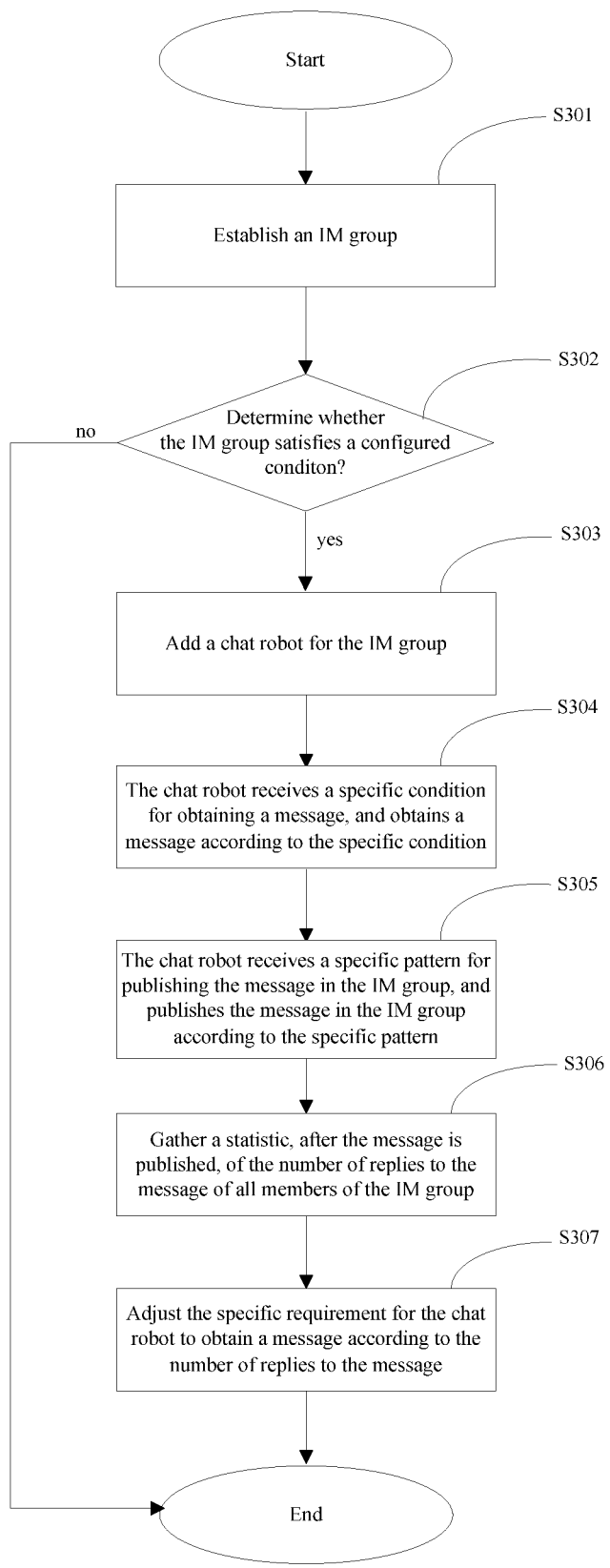
FIG. 3 is a flowchart illustrating a method for actively publishing a message in an IM group using a chat robot in accordance with a third method embodiment of the present invention.

FIG. 3 is a flowchart illustrating a method for actively publishing a message in an IM group using a chat robot in accordance with a third method embodiment of the present invention. The specific process is as follows:

In step S301, establish an IM group.

In step S302, determine whether the IM group satisfies a configured condition. In the embodiment, the configured condition is whether the IM group has paid fee. If the IM group has paid fee, perform step S303; otherwise, terminate the process.

In step S303, add a chat robot in the IM group.

In step S304, the chat robot receives a specific condition for obtaining a message, and obtains a message according to the specific condition. The specific condition includes: the chat robot obtains a message from a specific message source at specific time according to a specific requirement. In the embodiment, the chat robot obtains the specific condition from the client. In the embodiment, the client can modify the specific condition automatically or artificially.

In the embodiment, the specific requirement may be a message members of the IM group is interested in. The specific time may be every one hour or three hours. There may be one or more specific message sources. The chat robot may obtain a message from the same multiple message sources every time, or random select one or several message sources from multiple message sources to obtain messages.

In step S305, the chat robot receives a specific pattern for publishing the message in the IM group, and publishes the message in the IM group according to the specific pattern. In the embodiment, the chat robot obtains the specific pattern from the client. In the embodiment, the client can modify the specific pattern automatically or artificially.

In the embodiment, the specific pattern refers to as follows. Once obtaining a message, the chat robot may publish the message to all members of the IM group.

In step S306, gather a statistic, after the message is published, of the number of replies to the message of all members of the IM group. The statistic result may be represented in the form of a table, and the table includes message content and the number of replies to the message of all members.

In step S307, adjust the specific requirement for the chat robot to obtain a message according to the number of replies to the message. In an embodiment of the present invention, every time publishing a message, the chat robot automatically gathers the statistic of the number of replies to the message of all members, and returns a statistic result to the client. The client modifies the specific requirement for the chat robot to obtain a message according to a message type to which the number of replies is the largest. The modification may be performed manually, or be performed by the client automatically. After modifying the specific requirement, the client may send the modified specific requirement to the chat robot.

For example, when the chat robot publishes news on the latest military intelligence, and the number of replies to the news of the whole IM group is larger than 50, the news of military intelligence is taken as a message the IM group is interested in. Therefore, the specific requirement may be set to be a message on military intelligence.

In other embodiments of the present invention, the chat robot may modify the specific condition by itself, instead of returning the statistic result to the client. In yet another embodiment of the present invention, the chat robot may send the statistic result to the server, and the server performs the modification.

Figure 4:
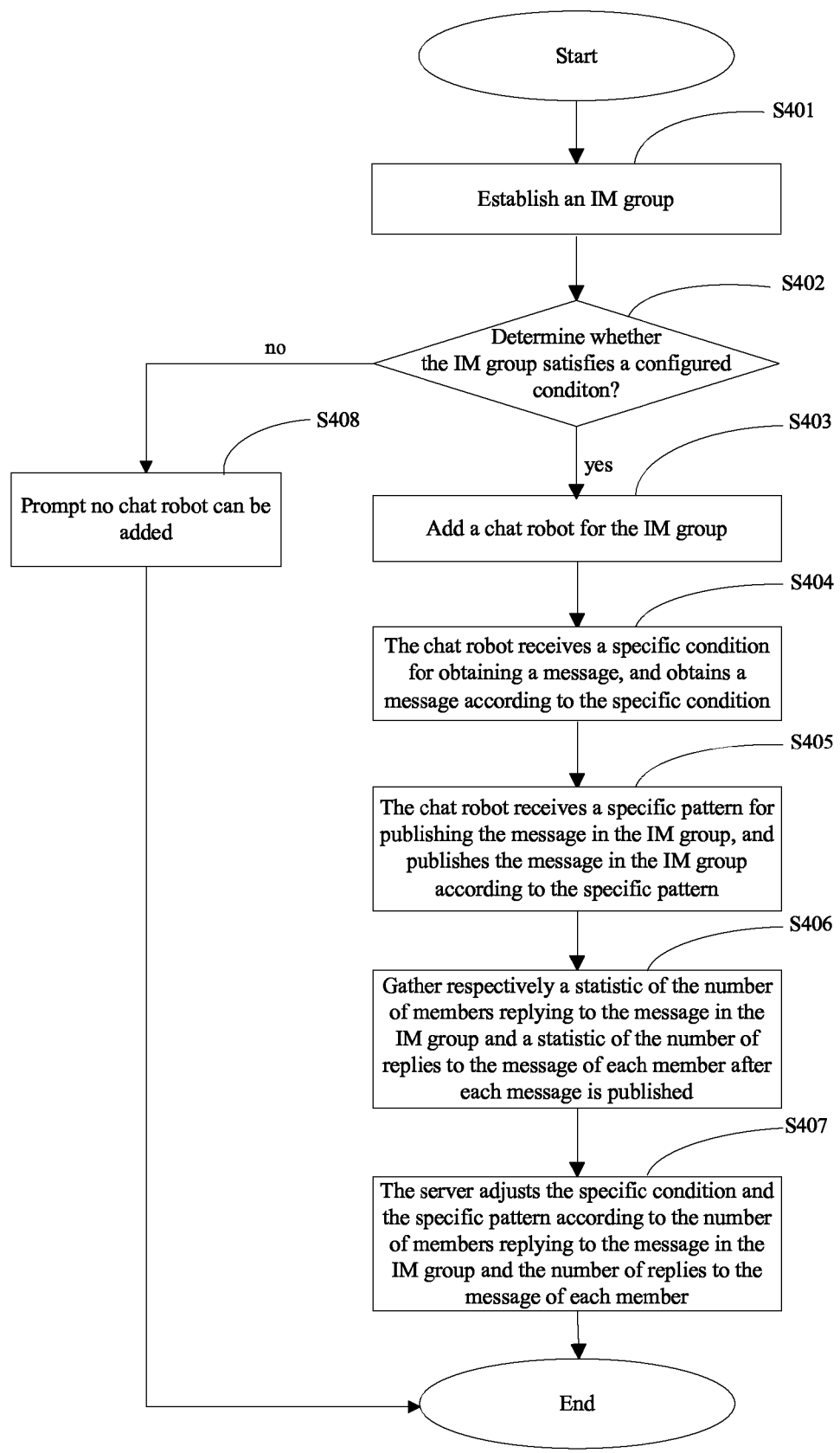
FIG. 4 is a flowchart illustrating a method for actively publishing a message in an IM group using a chat robot in accordance with a fourth method embodiment of the present invention.

FIG. 4 is a flowchart illustrating a method for actively publishing a message in an IM group using a chat robot in accordance with a fourth method embodiment of the present invention. The specific process is as follows:

In step S402, establish an IM group.

In step S402, determine whether the IM group satisfies a configured condition. In the embodiment, the configured condition is whether the IM group is established by a member. If the IM group is established by a member, perform step S403; otherwise, perform step S408.

In step S408, prompt that the user is not a member, and can not add a chat robot.

In step S403, add a chat robot in the IM group.

In step S404, the chat robot receives a specific condition for obtaining a message, and obtains the message according to the specific condition. The specific condition may be to obtain hot sports news from a portal website at 12 a.m. every day.

In step S405, the chat robot receives a specific pattern for publishing the message in the IM group, and publishes the message in the IM group according to the specific pattern. In the embodiment, the specific pattern is to publish a message to all members of the IM group at 12 a.m. every day, and publishing a message to part of members of the IM group at 1 p.m. every day.

In step S406, every time publishing a message, the chat robot gathers a statistic of the number of members replying to the message in the IM group and a statistic of the number of replies to the message of each member. If more than 50% of members of the IM group reply to the message, the message is taken as a message members of the IM group are interested in. If less than 5% of members of the IM group reply to the message, the message is taken as a message members of the IM group are not interested in. For some messages, if the number of replies of a member is larger than 5, the member is considered to be extremely interested in the messages; if a member does not reply to a message, the member is considered to be completely uninterested in the message.

In step S407, the server adjusts the specific condition and the specific pattern according to the number of members replying to the message in the IM group and the number of replies to the message of each member. For instance, the specific condition for the chat robot to obtain a message may be adjusted according to the number of members replying to the message in the IM group. For example, the system default specific condition is to obtain hot sports news from a portal website at 12 a.m. every day, but after hot news about badminton is published, no one in the IM group replies to the news, then news about badminton is regarded as news which the IM group is uninterested in, and thereafter the chat robot does not obtain hot news about badminton any longer, instead, the chat robot turns to obtain other hot sports news.

Another example, after football sports news is published, almost all members in the IM group are involved in the discussion, then the football sports news is regarded as news which the IM group is interested in, and the specific condition may be adjusted as follows: to obtain hot football news from a portal website at 12 a.m. every day.

In another embodiment of the present invention, after news about table tennis is published, the replies of member A and member B are more than 20, but other members returns hardly any replies, then the member A and member B may be considered to be interested in table tennis. Thereafter, the chat robot does not publish news about table tennis in the IM group any longer, but only send news about table tennis to the member A and member B.

In the embodiment that messages are obtained from multiple specific message sources, the message sources from which the chat robot obtains messages may be adjusted, and the time when the chat robot obtains messages may be also adjusted. Those skilled in the art may select different specific conditions according to actual network condition and replies of IM group members, to enhance the IM group activity as much as possible.

In a simplified embodiment of the present invention, the message that each member in the IM group is interested in may be determined by observing the number of replies and reply content of each member in the IM group, so as to further restrict the specific condition for selecting a message.

In other embodiments of the present invention, it is possible to publish a message that all of or part of IM group members are interested in to them as demanded. It is also possible to record online time of each IM group member, so as to set time for publishing the message.

Figure 5:
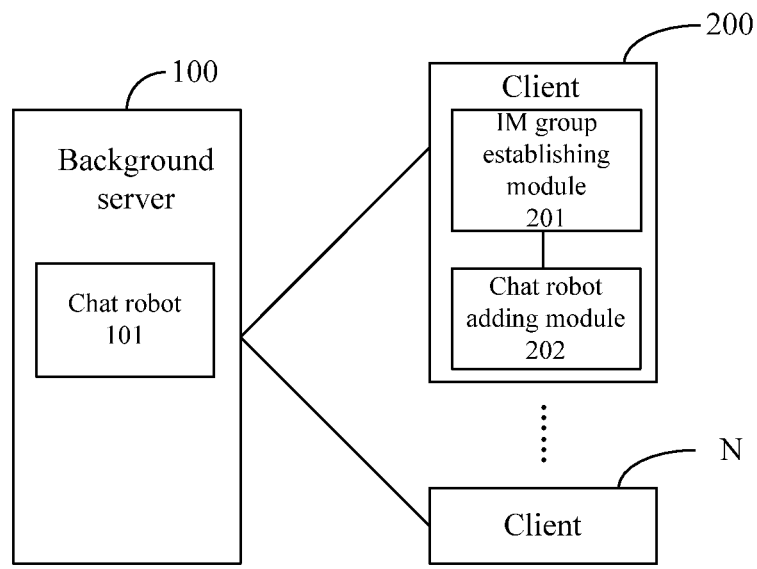
FIG. 5 is a schematic diagram illustrating a system for actively publishing a message in an IM group using a chat robot in accordance with a first system embodiment of the present invention.

FIG. 5 is a schematic diagram illustrating a system for actively publishing a message in an IM group using a chat robot in accordance with a first system embodiment of the present invention.

As shown in FIG. 5, the system includes a background server 100 and a client 200. The background server 100 includes a chat robot 101. The client 200 includes an IM group establishing module 201 configured to establish an IM group, and a chat robot adding module 202 configured to add the chat robot 101 in the IM group based on a configured condition. The chat robot 101 automatically publishes a message to the IM group. The chat robot 101 is an artificial intelligence robot, which can always online through communication means and communicate with people using a natural language. By adding a chat robot in the IM group and a function of timed publishing messages by the chat robot to increase message quantity and topics of the IM group, thus not only messages can be sent to users in time, but also IM group activity may be enhanced, which enables users to accept and love the IM group gradually.

Figure 6:
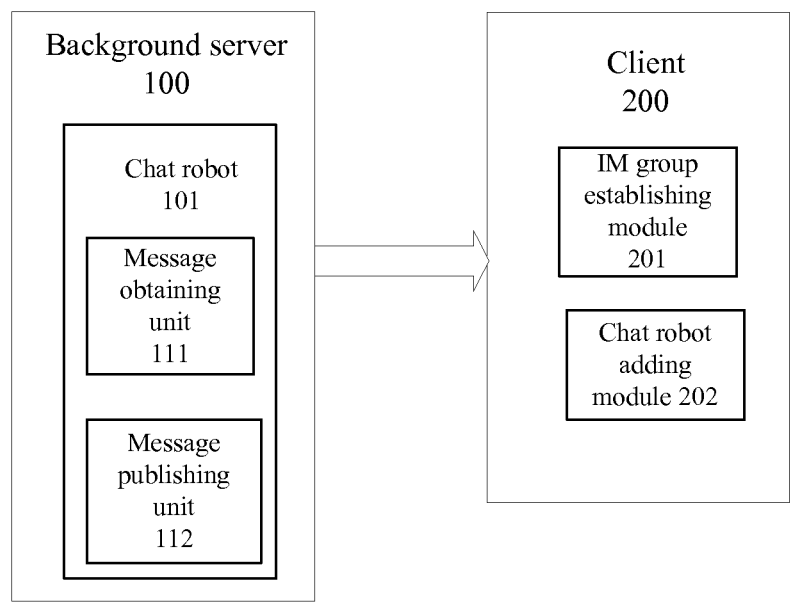
FIG. 6 is a schematic diagram illustrating a system for actively publishing a message in an IM group using a chat robot in accordance with a second system embodiment of the present invention.

FIG. 6 is a schematic diagram illustrating a system for actively publishing a message in an IM group using a chat robot in accordance with a second system embodiment of the present invention. As shown in FIG. 6, the system of the present invention includes a background server 100 and a client 200. The background server 100 includes a chat robot 101. The client 200 includes an IM group establishing module 201 configured to establish an IM group, and a chat robot adding module 202 configured to add the chat robot 101 in the IM group based on a configured condition. The chat robot further includes a message obtaining unit 111 and a message publishing unit 112. The message obtaining unit 111 is configured to obtain a message according to a specific condition. The message publishing unit 112 is configured to publish the message in the IM group according to a specific pattern. The specific pattern and the specific condition may be configured with reference to foregoing embodiments. Those skilled in the art are familiar with and able to construct and implement the configuration. The specific condition and the specific pattern may be obtained from the client or the server. In another embodiment of the present invention, the specific condition and the specific pattern may also be automatically generated by the chat robot.

Figure 7:
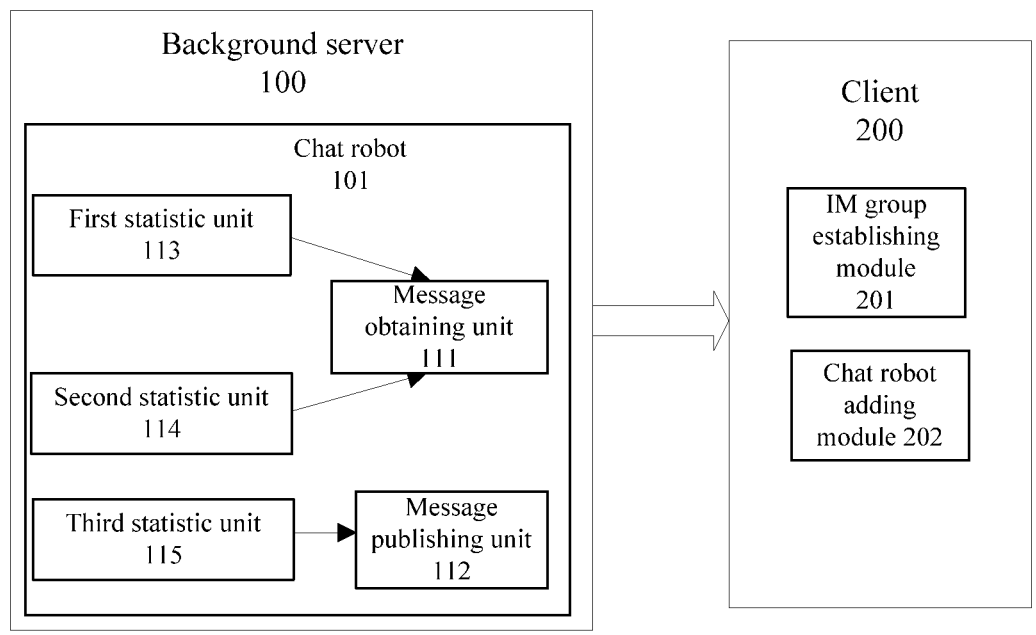
FIG. 7 is a schematic diagram illustrating a system for actively publishing a message in an IM group using a chat robot in accordance with a third system embodiment of the present invention.

FIG. 7 is a schematic diagram illustrating a system for actively publishing a message in an IM group using a chat robot in accordance with a third system embodiment of the present invention. The system in FIG. 7 is similar to that in FIG. 6, and the difference between them is as follows. The chat robot 101 further includes a first statistic unit 113 configured to gather a statistic, after the message is published, of the number of replies to the message of all members in the IM group, a second statistic unit 114 configured to gather a statistic, after the message is published, of the number of members replying to the message in the IM group, and a third statistic unit 115 configured to gather a statistic, after the message is published, of the number of replies to the message of each member in the IM group. In a simplified embodiment of the present invention, the chat robot 101 may include any one or more of the first statistic unit 113, the second statistic unit 114 and the third statistic unit 115. The message publishing unit 112 adjusts the predetermined pattern according to a statistic result of the first statistic unit 113 and/or the second statistic unit 114 and/or the third statistic unit 115, and publishes the message in the IM group according to adjusted pattern.

In an embodiment of the present invention, the chat robot 101 includes the first statistic unit 113 and the third statistic unit 115. The first statistic unit 113 gathers a statistic, after the message is published, of the number of replies to the message of all members. When the total number of replies is larger than a certain value, such as 20, the type of the message is taken a message type that the IM group is interested in. The message obtaining unit 111 adjusts the specific condition for the chat robot to obtain a message according to the number of replies to the message of all members. For example, when the chat robot publishes a message of latest military intelligence, the number of replies to the message of all IM group is larger than 50, a military intelligence message is taken as a message that the IM group is interested in. Therefore, the chat robot may be set to obtain messages of military intelligence as much as possible from a specific resource.

The third statistic unit 115 gathers a statistic, after each message is published, of the number of replies to the message of each member. For some messages, if the number of replies of a member is larger than 5, the member is taken to be considered to be extremely interested in the messages; if a member does not reply to a message, the member is considered to be completely uninterested in the message. The message publishing unit 202 may adjust the specific pattern for publishing a message in the IM group according to the number of replies of each member in the IM group. For instance, the specific pattern may be adjusted to publish a message to part of members of the IM group.

In another embodiment of the present invention, the chat robot 101 includes the second statistic unit 114 and the third statistic unit 115. The second statistic unit 114 is configured to gather a statistic, after the message is published, of the number of members replying to the message in the IM group. If more than 50% of members of the IM group reply to the message, the message is taken as a message members of the IM group are interested in. If less than 5% of members of the IM group reply to the message, the message is taken as a message members of the IM group are not interested in. The message obtaining unit 111 adjusts the specific condition for the chat robot to obtain a message according to the number of members replying to the message. The third statistic unit 115 gathers a statistic, after the message is published, of the number of replies to the message of each member. Regarding some messages, if the number of replies of a member is larger than 5, the member is considered to be extremely interested in the messages; if a member does not reply to a message, the member is considered to be completely uninterested in the message. The message publishing unit 202 may adjust the specific pattern for publishing a message in the IM group according to the number of replies of each member in the IM group.

According to the teachings and instructions of the present invention, those skilled in the art can combine the method and apparatus of the present invention with other existing method and apparatus, so as to apply the method and system in other suitable domain. When one or more IM group members chat with the chat robot respectively, the chat robot may be presented as an ordinary one, and communicate with people using a natural language. In addition to the chat function, the chat robot also possesses many value-added services, such as weather inquiry, map inquiry, life news inquiry, calculator, dictionaries, and so on.

Therefore, the present invention may be achieved by hardware, software, or the combination of hardware and software. The present invention may be achieved with a concentrated manner in at least one computer system, or be achieved with a decentralized manner in different parts of several interconnected computer systems. Any computer system or other device which can achieve the method may be applicable. The common combination of software and hardware may be the general computer system installed with computer program. The computer system may be controlled by installing and executing the program, to enable it to run according to the method.

Although the present invention is described with reference to detailed embodiments, those skilled in the art should understand that, various transformations and equivalent substitution may be performed without departing from the scope of the present invention. For specific conditions or materials, various modifications may be performed without departing from the scope of the present invention. Therefore, the present invention is not limited to the disclosed detailed embodiments, and should include all embodiments covered by the protection scope claimed by the present invention.

The invention claimed is:

1. A method for actively publishing a message in an Instant Messaging (IM) group using a chat robot, the method comprises:
   a client adding a chat robot in an IM group when determining that the IM group satisfies a configured condition;
   the chat robot obtaining the message and publishing the message in the IM group;
   wherein the chat robot obtaining the message and publishing the message in the IM group comprises:
   the chat robot receiving a second condition for obtaining the message, and obtaining the message according to the second condition; wherein, the second condition comprises: obtaining messages from more than one specific message source at specific time in the light of a specific requirement;
   the chat robot receiving a pattern, and publishing the message in the IM group according to the pattern; wherein the pattern comprises: predetermined publishing time and publishing objects in the IM group;
   wherein the chat robot obtaining the message and publishing the message in the IM group further comprises:
   gathering a statistic of the number of replies to the message published, wherein the replies are made by members in the IM group; and
   adjusting the second condition according to the number of replies to the message published; and obtaining a further message according to the adjusted second condition.

2. The method according to claim 1, before the client adding a chat robot in the IM group, further comprising:
establishing an IM group in the client.

3. The method according to claim 2, wherein the client adding a chat robot in the IM group when determining that the IM group satisfies a configured condition comprises:
the client determining whether the IM group satisfies the configured condition;
the client adding the chat robot in the IM group when the IM group satisfies the configured condition; otherwise, returning a prompt information.

4. The method according to claim 3, wherein the configured condition comprises at least one of:
whether the IM group is a member group;
whether the IM group has paid fee; and
whether the server is to add a chat robot in the IM by default.

5. The method according to claim 1, wherein the chat robot obtaining the message and publishing the message in the IM group further comprises:
gathering a statistic of the number of members replying to the message published in the IM group;
adjusting the second condition according to the number of members replying to the message in the IM group.

6. The method according to claim 5, wherein the chat robot obtaining the message and publishing the message in the IM group further comprises:
gathering a statistic of the number of replies to the message of each member in the IM group;
adjusting the pattern according to the number of replies of each member in the IM group.

7. A system for actively publishing a message in an IM group using a chat robot, the system comprises: a server comprising a processor coupled to a memory storing instructions for execution by the processor, and a client comprising a processor; the processor of the client is configured to establish an IM group; the memory of the server stores instructions for achieving a chat robot;
the processor of the client is further configured to add the chat robot in the IM group when determining that the IM group satisfies a configured condition;
the chat robot is to obtain and publish the message in the IM group;
wherein instructions for achieving the chat robot comprises:
a message obtaining instruction, indicating to obtain the message according to a predetermined condition; wherein, the predetermined condition comprises: obtaining messages from more than one specific message source at specific time in the light of a specific requirement;
a message publishing instruction, indicating to publish the message in the IM group according to a predetermined pattern; wherein the predetermined pattern comprises: predetermined publishing time and publishing objects in the IM group;
wherein the instructions for achieving the chat robot further comprises at least one of a first statistic instruction;
the first statistic instruction indicates to gather a statistic of the number of replies to the message published, wherein the replies are made by members in the IM grow;
the message obtaining instruction further indicates to adjust the predetermined condition according to statistic results obtained from the execution of the first statistic instruction, and obtain a further message according to the adjusted condition.

8. The system according to claim 7, wherein the instructions for achieving the chat robot further comprises at least one of a first statistic instruction, a second statistic instruction and a third statistic instruction;
the first statistic instruction indicates to gather a statistic of the number of replies to the message published of members in the IM group;
the second statistic instruction indicates to gather a statistic of the number of members replying to the message published in the IM group;
the third statistic instruction indicates to gather a statistic of the number of replies to the message published of each member in the IM group;
the message publishing instruction further indicates to adjust the predetermined pattern according to at least one of statistic results obtained from the execution of the first statistic instruction, the second statistic instruction and the third statistic instruction, and publish the message in the IM group according to adjusted pattern.

9. The system according to claim 7, wherein the instructions for achieving the chat robot further comprises: a second statistic instruction;
the second statistic instruction indicates to gather a statistic of the number of members replying to the message published in the IM group;
the message obtaining instruction further indicates to adjust the predetermined condition according to statistic results obtained from the execution of the second statistic instruction, and obtains a message according to adjusted condition.

10. The system according to claim 9, wherein the instructions for achieving the chat robot further comprises:
a third statistic instruction, indicating to gather a statistic of the number of replies to the message published of each member in the IM group;
the message publishing instruction further indicates to adjust the predetermined pattern according to a statistic result obtained from the execution of the third statistic instruction, and publish the message in the IM group according to adjusted pattern.

* * * * *